United States Patent [19]

Heesch

[11] Patent Number: 4,720,144
[45] Date of Patent: * Jan. 19, 1988

[54] MANUAL SEAT RECLINER

[75] Inventor: Max O. Heesch, Ypsilanti, Mich.

[73] Assignee: ITT Corporation, New York, N.Y.

[*] Notice: The portion of the term of this patent subsequent to Mar. 4, 2003 has been disclaimed.

[21] Appl. No.: 787,267

[22] Filed: Oct. 15, 1985

Related U.S. Application Data

[63] Continuation of Ser. No. 681,957, Dec. 14, 1984, Pat. No. 4,573,738.

[51] Int. Cl.[4] .............................................. B60N 1/02
[52] U.S. Cl. .................................... 297/362; 297/374
[58] Field of Search .................. 297/362, 374, 96, 68, 297/75, 76, 330, 355; 192/8 C; 188/77 W

[56] References Cited

U.S. PATENT DOCUMENTS

| | | | |
|---|---|---|---|
| 1,287,958 | 12/1918 | Giberson | 297/68 |
| 1,773,597 | 8/1930 | Myerson | 297/355 |
| 2,834,397 | 5/1958 | Kluglein et al. | 297/68 |
| 3,028,933 | 4/1962 | Mueller | 188/77 W |
| 4,045,081 | 8/1977 | Ueno | 297/68 |
| 4,278,032 | 7/1981 | Kritske | 192/8 C |
| 4,521,055 | 6/1985 | Fudala | 297/362 |
| 4,573,738 | 3/1986 | Heesch | 297/374 |

Primary Examiner—Francis K. Zugel
Attorney, Agent, or Firm—James B. Raden; Robert P. Seitter

[57] ABSTRACT

A seat recliner is provided comprising a seat back support mounted at a pivot pin to a base frame. A sector gear is affixed to the seat back support and includes an opening through which the pivot pin passes. A first gear set is mounted on a pin in the base frame and includes a first gear meshed with the sector gear and a second gear. A second gear set is also mounted on a pin in the base frame and includes a first gear meshed with the second gear of the first gear set and a second gear. A clutch spool is mounted on a pin in the base frame and includes a gear meshed with the second gear of the second gear set. A coil spring surrounds the clutch spool. When the spring is tensioned, the clutch spool is prevented from rotating and the seat back is held from rotational movement about the pivot pin. A clutch release plate contacts the spring coil in a manner such that a selected movement of the release plate decreases the coil spring tension on the clutch spool. This permits rotation of the clutch spool and subsequent rotational movement of the seat back support.

1 Claim, 2 Drawing Figures

FIG. I

MANUAL SEAT RECLINER

This is a continuation of application Ser. No. 681,957, filed Dec. 14, 1984, now U.S. Pat. No. 4,573,738.

BACKGROUND OF THE INVENTION

The present invention relates to automotive seat recliners and, more particularly, to a manual clutch release seat recliner having a gearing mechanism to permit the controlled reclining of an automotive seat back.

Automotive seats usually comprise a seat bottom that is affixed to a seat frame. The seat frame is mounted to the floor of the vehicle and is usually of a rail type design to allow the forward and rearward adjustment of the seat bottom. The seat back is attached to the seat bottom by a seat back support. If the seat is a reclining type seat where the seat back is rotationally movable with respect to the seat bottom, a locking and release mechanism must be provided. The seat reclining mechanism usually comprises a base that is affixed to the structure of the seat bottom. The seat back support is pivotally mounted to such base as it is desirable to have the seat back move forward and rearward with the seat bottom. The locking and release mechanism by which the seat back is held in a fixed angular relative to the seat bottom has several known forms. One form is a ratchet mechanism wherein a notched wheel is affixed to either the seat back or seat bottom and a pawl is attached to the other. Upon the pawl disengaging the notched wheel, the seat back is released and is free to rotate at is pivot with respect to the seat bottom. Other types of engaging or intermeshing gear type mechanisms all provide a locking and a releasing operation between the seat bottom and seat back.

Certain drawbacks are present in these known seat back locking and release mechanisms. Due to the potentially great forces to which a vehicle seat back can be subjected, a locking mechanism at the pivot between the seat back and the seat bottom must be a relatively sturdy and heavy unit. This is undesirable in the ongoing attempt at decreasing the weight of vehicles to achieve greater fuel efficiency. Another problem with such known locking and release mechanisms concerns the abrupt release and locking of the mechanism. If a passenger desires to rotate the seat back with respect to the seat bottom, and the locking mechanism is a ratchet and pawl assembly, once the pawl is released there is no restraint on the seat back. There is no clutching possible in such an arrangement wherein the seat restraining force could gradually be released to allow the passenger to move the seat as desired and then reengage the locking mechanism. Such known mechanisms are either locked or released with no partial "in-between" settings possible. Such a clutching or partial release operation of a locking mechanism is desirable.

A final problem with such known seat back support locking mechanisms is that a finite number of reclined positions are possible depending on the number of notches in the ratchet wheel. Because of the strength required of the locking mechanism, it is not desirable to make the notches very small and closely spaced to provide many possible reclining positions. Rather, the number of reclining positions is rather limited because of the need to have quite strong notches and protrusions from the ratchet wheel. A locking mechanism having an infinite number of settings is desirable.

Accordingly, it is an object of the present invention to provide an improved reclining seat back locking mechanism. SUMMARY OF THE INVENTION The present invention provides a seat recliner mechanism having a seat back support pivotally mounted to a base frame associated with the seat bottom. A latch and clutch release mechanism provides controlled reclining of the seat back.

A structural position of the seat back is affixed to a seat back support. Such seat back support is an elongated metal piece which may have flanged edges for additional strength. The seat back support is joined at a pivot pin which extends through a hole near the lower end of the seat back support. The pivot pin is mounted between an elongated outer plate and an elongated inner plate which are held in spaced relation to each other by spacer elements such as rivets and which together form a base frame. This base frame is mounted to a structural portion of the seat bottom. The base frame and the seat back support are usually located on the outer edge of the seat assembly. This permits the seat frame and seat back support to be accessible for adjustment or repair by the simple removal of a cover plate.

A sector gear is affixed to the lower position of the seat back support usually by welding. The sector gear typically comprises a wedge shaped sector of a circular toothed wheel, having a hole at about the center curvature of its curved edge. The curved edge includes teeth forming the gear. The sector gear also includes a stop pin extending from the flat surface of the sector gear about half-way between the hole and the toothed edge. The hole receives the pivot pin which provides the pivot between the seat back support and the base frame. The stop pin extends through a curved opening in the outer plate of the base frame. The rotational movement of the seat back is thusly limited to the length of the curved opening.

A first gear set comprises a smaller diameter toothed wheel or gear and a larger diameter toothed wheel or gear having their center axis openings aligned such that the wheels are mounted on the same shaft. Both wheels rotate with the shaft. This shaft comprises a support pin having ends that extend into openings in the outer and inner plates of the base frame. The smaller toothed wheel is in meshed engagement with the toothed edge of the sector gear. A coiled assist spring is frequently placed around the one end of the pin that extends out from the outer plate of the base frame. The end of the spring extending out from the coil is engaged with the outer plate. The surface of the pin to which the spring is mounted is in contact with the smaller toothed wheel. Accordingly, the spring assists in bringing the seat back upward from a reclined position by aiding the rotation of the smaller toothed wheel and, in turn, the sector gear which is affixed to the seat back support.

A second gear set comprises a smaller diameter toothed wheel or gear and a larger diameter toothed wheel or gear having their center axis openings aligned such that the wheels are mounted on the same shaft. Both wheels rotate with the shaft. This shaft comprises a support pin having ends that extend into openings in the outer and inner plates of the base frame. The smaller toothed wheel is in meshed engagement with the larger toothed wheel of the first gear set. A clutch spool has a center axis opening receiving a support pin having ends that extend into openings in the outer and inner plates of the base frame. The clutch spool has a toothed wheel or gear that is meshed with the larger toothed wheel of the second gear set. The clutch spool rotates on the shaft with the toothed wheel. Two coil springs are coiled around the clutch spool. The springs are wound in opposite directions and are placed in tandem on the clutch spool. One end of the each of the springs extends outwardly therefrom and such ends laterally adjacent each other with a vertical space therebetween. The tension of these springs keeps the clutch spool from rotating and, accordingly, acting through the various meshed gears, keeps the seat back support locked from rotation. The use of two oppositely wound springs is preferred as this provides positive tension in both directions of rotation of the clutch spool. But one spring of appropriate tension could also be utilized.

A clutch release plate is mounted on support pins set in the outer plate of the base frame. The clutch release plate is an elongated metal piece having slots receiving the support pins such that the plate is slidable. An end section of the clutch release plate extends into the vertical space between the springs on the clutch spool. If only one spring were used, the end section of the release plate would be affixed with it. A clutch release lever has an opening that receives one of the clutch release plate support pins such that the release lever is rotatable about such pin. A handle usually extends from the release lever. An end section of the release lever extends into an opening in the clutch release plate or engages the release plate in another manner such that upon the rotation of the release lever, the clutch release plate is slid forwardly along its slots. This sliding action causes the end section of the release plate to separate the coil springs around the clutch spool and thereby lessen the tension in the clutch spool an amount proportional to the degree that the release lever is rotated. When the release lever is released, a separate return spring acting on the release plate pulls the release plate backwardly and causes the full spring tension to be returned to the clutch spool, thereby locking the seat back in the desired reclined position.

It is seen that the seat recliner mechanism of the present invention overcomes the problems of the known systems. The clutch of the present invention need not be overly large or weighty as the gear mechanism provides about a twenty to one mechanical advantage in reducing the seat back load seen by the clutch spool. The clutch may be partially released to allow small adjustments in the degree of seat back reclining, or may be totally released to allow large rapid adjustment in the seat back. Finally, the spool type clutch provides locking of the seat back in an infinite number of desired degrees of reclining.

It should be understood that the use of two gear sets with the sector gear and the clutch spool is a preferred embodiment of the present invention. It would be a matter of design choice to use only one gear set or three or more gear sets. The important feature is that the seat back loading is reduced such that the wrap spring clutch can provide the necessary locking forces. Such locking forces are regulated to certain minimums by industry standards.

In particular, the present invention provides a seat recliner comprising a seat back support, a sector gear affixed to said seat back support, a base frame including an iner plate and an outer plate held in spaced relationship by spacer elements, a pivot means joining said seat back support and said sector gear to said base frame, a first gear set mounted on a pin set between said inner plate and said outer plate of said base frame, said first gear set having a first toothed gear meshed with the teeth on said sector gear and a second toothed gear, a clutch spool mounted on a pin set between said inner plate and said outer plate of said base frame, said clutch spool having a toothed gear meshed with the second toothed gear of said gear set, a spring coil means around said clutch spool such that when tensioned, said spring coil means prevents said clutch spool from rotating and thusly locks said back support in a selected position, and a clutch release plate mounted on said base frame, said clutch release plate affixed to said spring coil means in a manner such that upon a selected movement of said clutch release plate, the tension of said spring coil is released to prevent rotation of said clutch spool thereby permitting the rotational movement of said seat back support at said pivot means.

DESCRIPTION OF THE PREFERRED EMBODIMENT

Figure 1:
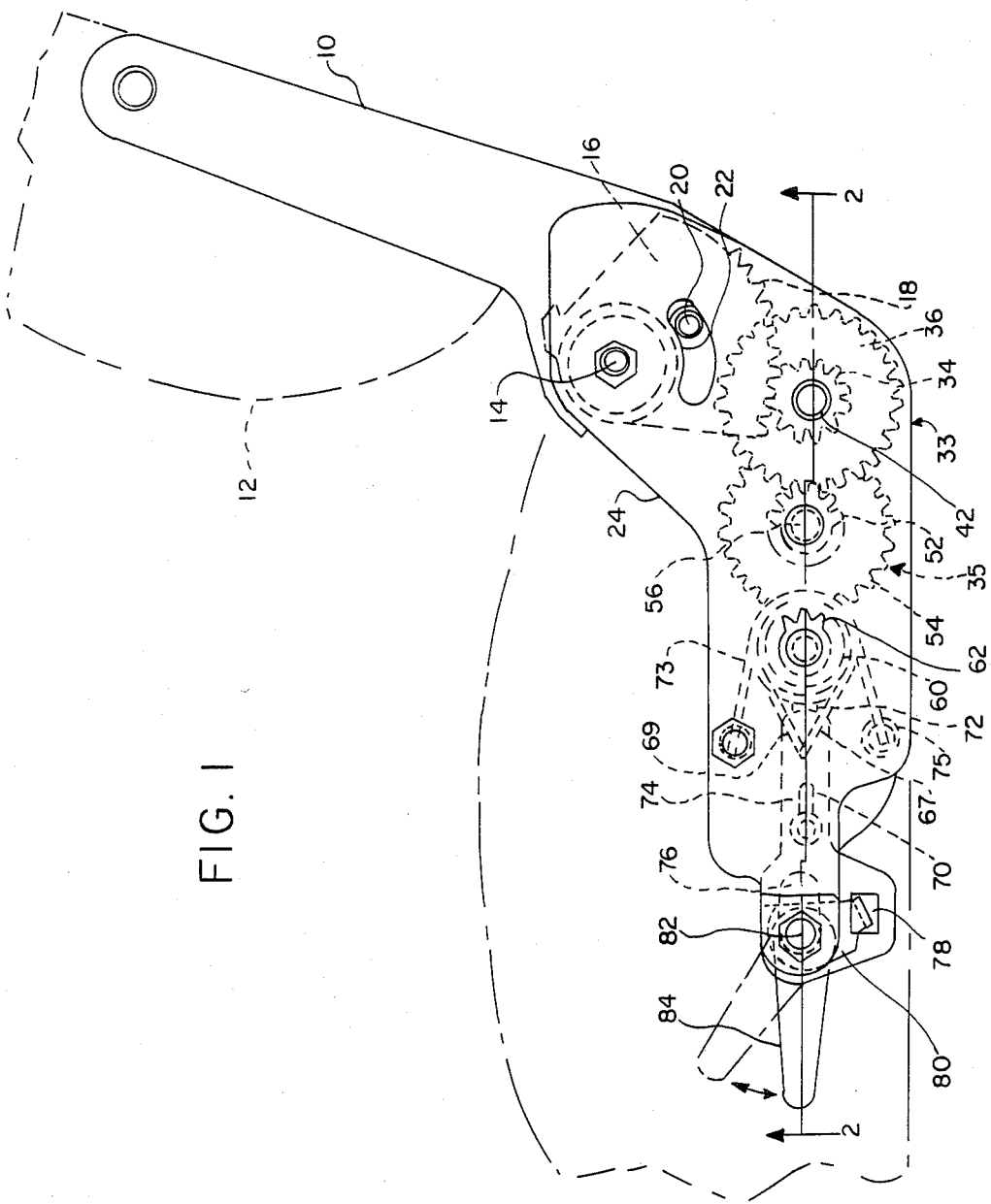
FIG. 1 is a side cross sectional view of the seat recliner of the present invention.
Figure 2:
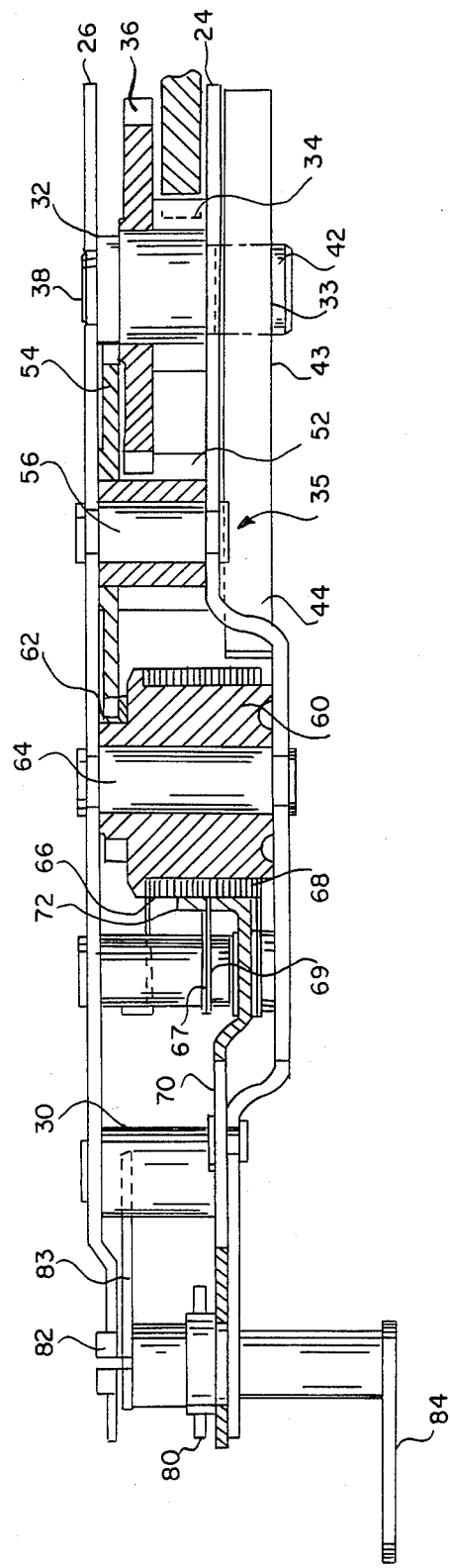
FIG. 2 is a partial cross sectional view along line 2—2 of the seat recliner of FIG. 1.

Referring now to FIGS. 1 and 2 of the drawings, a seat back recliner mechanism in accordance with the present invention is shown. An elongated metal seat back support 10 is shown to which partially shown seat back 12 is mounted. One end portion of seat back support 10 includes an opening through which pivot pin 14 passes. A sector gear 16 is of a circular section plate wedge shape and is affixed to seat back support 10 by means such as welding. Sector gear 16 has an opening through which pivot pin 14 passes thereby enabling sector gear 16 and seat back support 10 to rotate about pivot pin 14. Sector gear 16 also has a curved edge 18 from which gear teeth protrude. A stop pin 20 extends from the surface of sector gear 16 from a position nearby between the opening receiving pivot pin 14 and curved edge 18.

A base frame is comprised of an elongated outer plate 24 and an elongated inner plate 26 which are held in a spaced relation by a plurality of spacers such as shown at 30. One end of outer plate 24 and inner plate 26 extends upwardly and has an opening through which pivot pin 14 passes. Accordingly, seat back support 10 is rotatable with respect to the base frame about pivot pin 14. Outer plate 24 has a curved slot 22 through which stop pin 20 of sector gear 16 passes. This limits the rotation of seat back support 10 to the preselected length of slot 22. A bottom seat 28 is shown partially and is attached to the base frame.

A first gear set 33 comprises of smaller diameter toothed wheel or gear 34 and a larger diameter toothed wheel or gear 36 coaxially rotationally mounted to shaft 38. Shaft 38 is mounted between openings in outer plate 24 and inner plate 26. Smaller diameter gear 34 is meshed with the teeth on edge 20 of sector gear 16. An end 42 of shaft 38 protrudes from outer plate 24. A coil assist spring 43 has an end inserted in an opening in end 42 and another end 44 attached to outer plate 24. Assist spring 43 aids seat back support 10 in returning to an upright position from a reclined position by lending its rotational torque to smaller diameter gear 34 and, in turn, to sector gear 20 and seat back support 10.

A second gear set 35 comprises a smaller diameter toothed wheel or gear 52 and a larger diameter toothed wheel or gear 54 coaxially rotationally mounted to shaft 56. Shaft 56 is mounted between openings in outer plate 24 and inner plate 26. Smaller diameter gear 52 is meshed with the larger diameter gear 36 of the first gear set.

A cylindrically shaped clutch spool 60 has an axial opening and is rotationally mounted on a shaft 64 that extends between openings in outer plate 24 and inner plate 26. A smaller diameter gear 62 is mounted on spool 60 and engages larger diameter gear 54 of the second gear set. Two coiled springs 66, 68 are mounted in tandem or back to back around the outside of spool 60. The springs 66, 68 are coiled in opposite directions such that ends 67, 69 extend from the bottom and top, respectively, of spool 60 and accordingly a space is present therebetween. The other ends 73, 75 of springs 66, 68 are affixed to appropriate brackets on outer plate 24 and inner plate 26. When under tension, springs 66, 68 hold clutch spool 60 from rotating and, in turn through the first and second gear sets, 33, 35, lock seat back support 10 from rotating at pivot 14.

An elongated bar shaped clutch release plate 70 has an end 72 that extends into the space between spring ends 67, 69. Release plate 70 has slots 74, 76 through which pins 77, 82, respectively, pass to mount release plate 70 to outer plate 24. Release plate 70 has an opening 78 near one end thereof through which a projection of release lever 80 passes. Release lever 80 has an opening through which pin 82 passes thereby mounting release lever to pin 82. A release handle 84 is affixed to pin 82. A release shaft return spring 83 is affixed to shaft 82 and has an end affixed to spacer 30.

Upon the rotation of release handle 84, release lever 80 pulls against opening 78 of release plate 70 thereby moving release plate 70 laterally away from clutch spool 60. End 72 of release plate 70 contacts and separates spring ends 67, 69 to thereby release tension of springs 66, 68 on clutch spool 60. Accordingly, clutch spool 60 is free to rotate and, through the allowed rotation of the first and second gear sets 33, 35, sector 16 and seat back support 10 are freed to rotate as desired for the adjustment of seat back 12. When release handle 84 is released, return spring 83 will act on clutch release plate 70 to move it back toward clutch spool 60. Ends 67, 69 of springs 66, 68 are allowed to move together as end 72 of clutch plate 70 is moved out of contact with ends 67, 69. Accordingly, springs 66, 68 again tension on clutch spool 60 to lock it from further rotation. Seat back support 16 is locked in turn through the contact of the first and second gear sets 33, 35, and sector gear 16.

What is claimed is:

1. A seat recliner comprising:

a seat back support;

a sector gear having teeth, said sector gear connected to said seat back support;

a base frame;

pivot means at which said seat back support is pivotably joined to said base frame;

a first gear set having a first toothed wheel meshed with said teeth on said sector gear and a second toothed wheel;

a second gear set having a first tooth wheel meshed with said second tooth wheel of said first gear set and a second toothed wheel; a clutch spool having a toothed wheel meshed with said second tooth wheel of said second gear set:

spring coil means including two oppositely wound coil springs in tandem around said clutch spool such that when tensioned, said spring coils prevent said clutch spool from rotating in opposite directions and locks said seat back support in a selected position; and clutch release means contacting said spring coil means in a manner such that upon a selected movement of said clutch release means, the tension of said spring coil means is reduced to permit rotation of said clutch spool, thereby enabling movement of said seat back support, said clutch release means including a release lever mounted to said base frame and an elongated release plate mounted to said base frame for lateral slidable movement in response to movement of said release lever, said release plate having an end section positioned between one tang end of each of said two coil springs whereby said end section when moved laterally in a direction away from the clutch spool separates the tang ends of said coil springs.

* * * * *